United States Patent
Purkis

(10) Patent No.: US 12,487,104 B2
(45) Date of Patent: Dec. 2, 2025

(54) METHOD, DEVICE AND SYSTEM FOR RANGE FINDING

(71) Applicant: Well-Sense Technology Limited, Aberdeen (GB)

(72) Inventor: Daniel George Purkis, Dyce (GB)

(73) Assignee: Well-Sense Technology Limited, Dyce (GB)

( * ) Notice: Subject to any disclaimer, the term of this patent is extended or adjusted under 35 U.S.C. 154(b) by 287 days.

(21) Appl. No.: 18/044,018

(22) PCT Filed: Aug. 13, 2021

(86) PCT No.: PCT/EP2021/072611
§ 371 (c)(1),
(2) Date: Mar. 3, 2023

(87) PCT Pub. No.: WO2022/048885
PCT Pub. Date: Mar. 10, 2022

(65) Prior Publication Data
US 2024/0011804 A1    Jan. 11, 2024

(30) Foreign Application Priority Data

Sep. 3, 2020 (GB) .................................... 2013863

(51) Int. Cl.
*G01D 5/353* (2006.01)
*E21B 47/09* (2012.01)
(Continued)

(52) U.S. Cl.
CPC ......... *G01D 5/35361* (2013.01); *G01B 11/02* (2013.01); *G01M 11/3109* (2013.01); *E21B 47/09* (2013.01)

(58) Field of Classification Search
CPC ...... G01D 5/35361; G01B 11/02; E21B 47/09
(Continued)

(56) References Cited

U.S. PATENT DOCUMENTS

| 2003/0172752 A1 | 9/2003 | Kluth et al. |
| 2008/0204703 A1 | 8/2008 | Hernandezs-Solis et al. |
| 2009/0219171 A1 | 9/2009 | Vigneaux |

FOREIGN PATENT DOCUMENTS

| GB | 2354782 A | 4/2001 |
| GB | 2564661 A | 1/2019 |
(Continued)

OTHER PUBLICATIONS

Office Action for GB Application No. 2013863.2 dated Mar. 16, 2021.
(Continued)

*Primary Examiner* — Tarifur R Chowdhury
(74) *Attorney, Agent, or Firm* — Harness, Dickey & Pierce, P.L.C.

(57) ABSTRACT

A method 200, system and device for range finding are provided. The method 200 comprises determining 204 a first optical signature of a spool of optical fibre 16 wound in a winding pattern. The winding pattern comprises repeated changes in a winding parameter to provide a different optical response such that the first optical signature comprises a plurality of markers representing each change in the winding parameter. The method 200 further comprises despooling the fibre 16 from the spool; determining a second optical signature of the spool of optical fibre 16 after despooling the fibre 16 from the spool; and calculating 208 the length of despooled fibre based on a comparison of the first and the second optical signatures. The determined length may be used to determine a range of the spool of optical fibre 16 deployed in a wellbore.

20 Claims, 16 Drawing Sheets

(51) Int. Cl.
*G01B 11/02* (2006.01)
*G01M 11/00* (2006.01)

(58) Field of Classification Search
USPC .......................................................... 356/614
See application file for complete search history.

(56) References Cited

FOREIGN PATENT DOCUMENTS

| WO | WO-2017009671 A1 | 1/2017 | | |
|---|---|---|---|---|
| WO | WO-2019016538 A1 | * | 1/2019 | ........... E21B 47/135 |

OTHER PUBLICATIONS

International Search Report for International Application No. PCT/EP2021/072611 dated Nov. 10, 2021.
International Preliminary Report on Patentability for PCT Application No. PCT/EP2021/072611 dated Mar. 16, 2023.

* cited by examiner

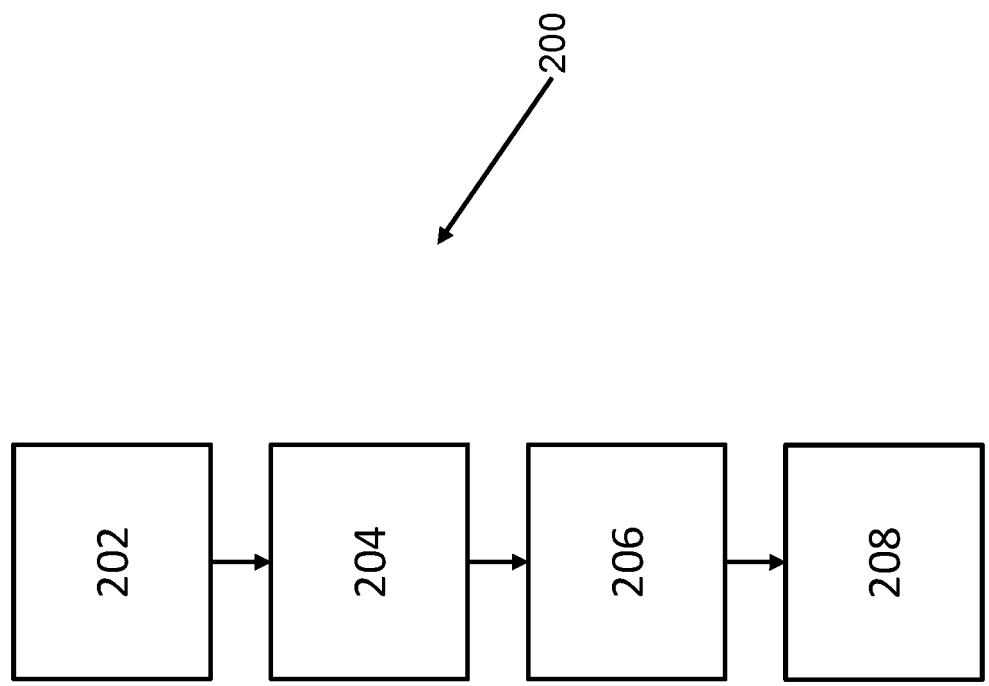

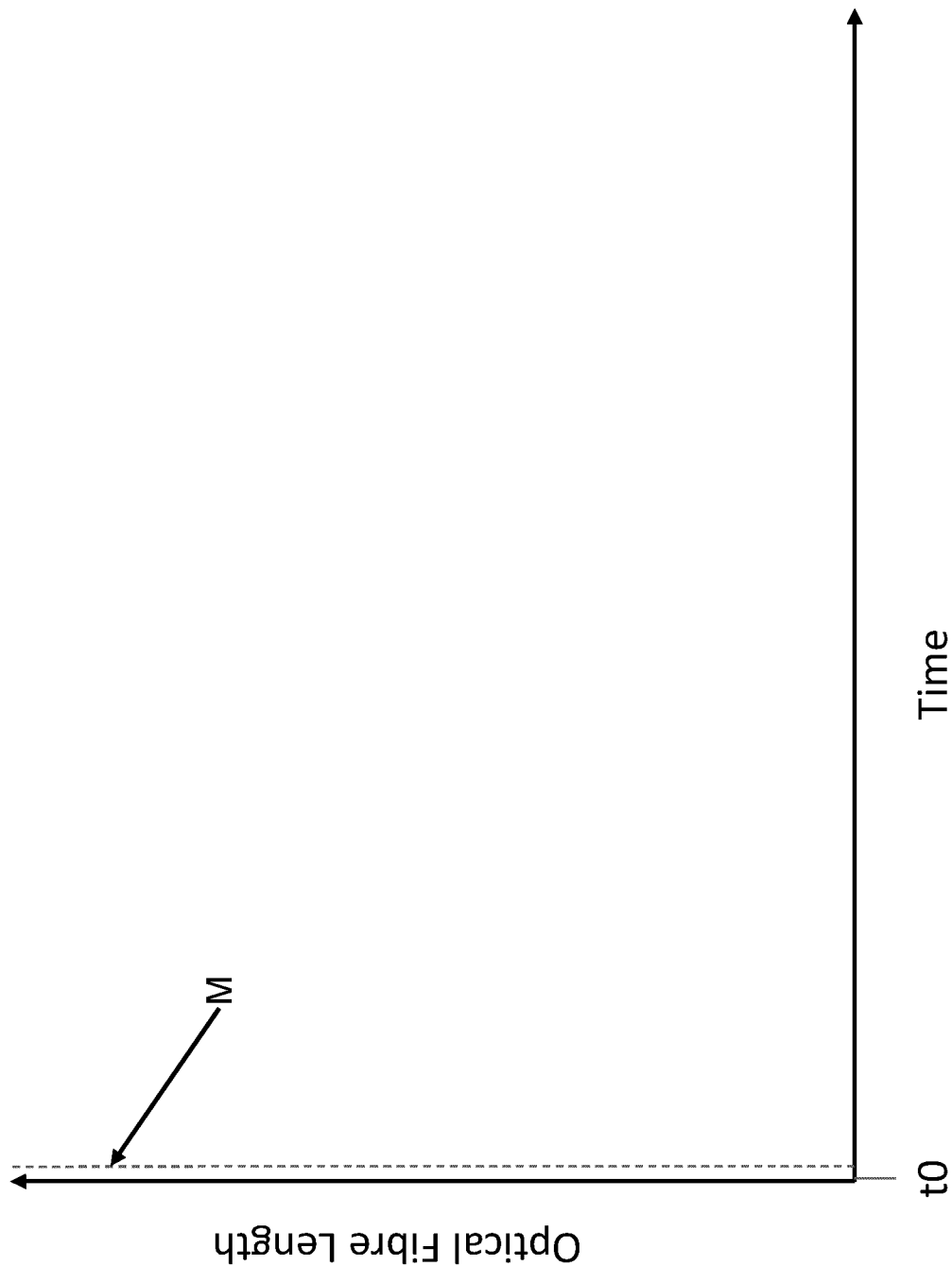

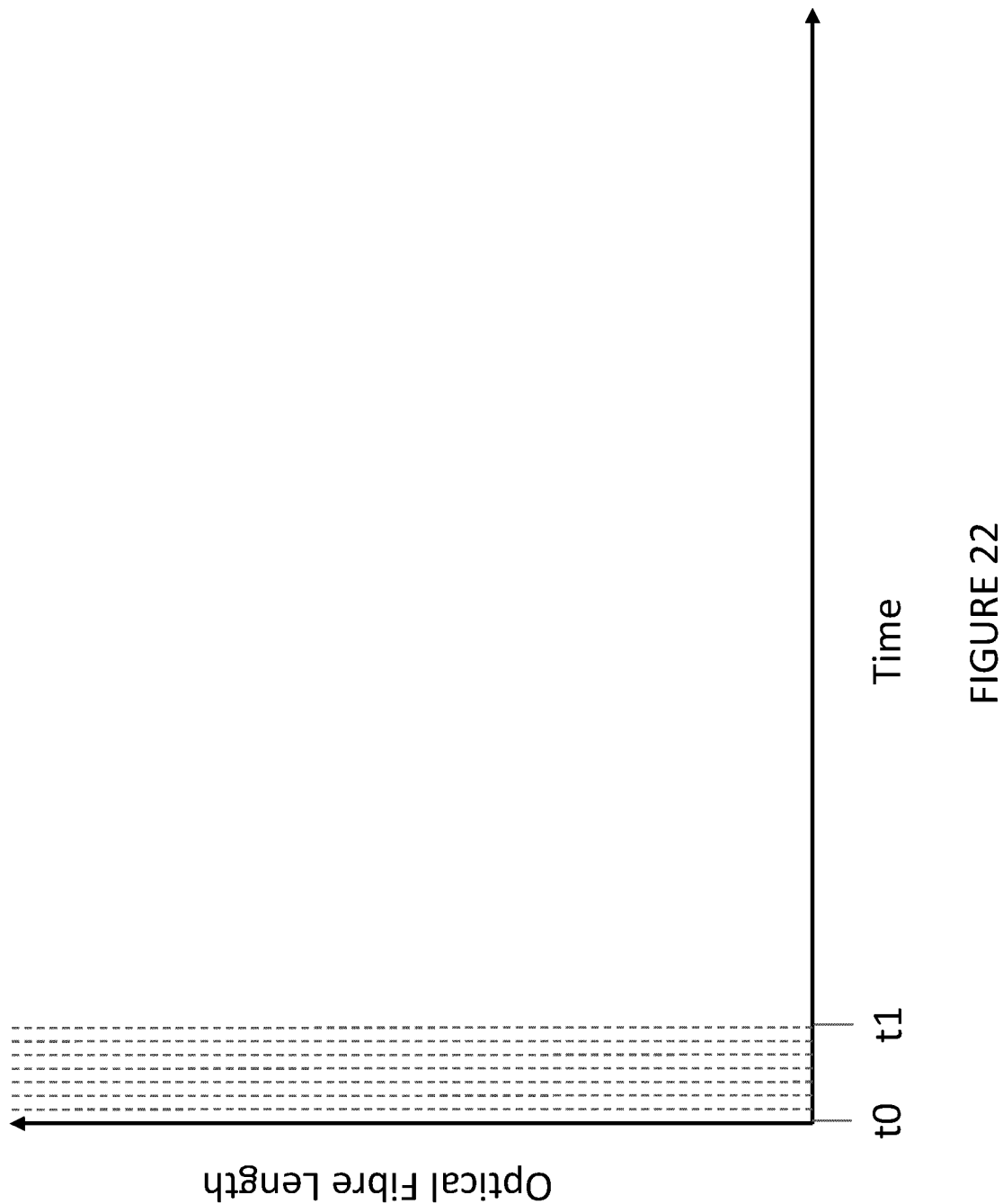

METHOD, DEVICE AND SYSTEM FOR RANGE FINDING

CROSS-REFERENCE TO RELATED APPLICATIONS

This application is a national phase under 35 U.S.C. § 371 of PCT International Application No. PCT/EP2021/072611 which has an International filing date of Aug. 13, 2021, which claims priority to United Kingdom Intellectual Property Application No. 2013863.2, filed Sep. 3, 2020, the entire contents of each of which are hereby incorporated by reference.

FIELD

The present disclosure relates generally to range finding, and in particular to methods for range finding, devices for use with spools of optical fibre for range finding, and systems for range finding.

BACKGROUND

Range finding is desirable in many applications, for example in the oil and gas industry. Deployment of tools in a wellbore of a well of unknown depths may be problematic in a number of instances. In drilling wells for oil and gas exploration and production, precise control of the path followed by the well is extremely difficult, so that it is virtually impossible to know the exact location of the well at a given depth. For example, a drilling tolerance of plus or minus one quarter of a degree will allow the bottom of a 3,048 m (10,000 foot) well to be positioned anywhere within a circle 26 m (87 feet) in diameter, and numerous factors can increase this deviation. This may not be a concern in normal drilling operations, but if an accident should occur, such as a rupture in the casing of the well which causes the well to blow out, it may become necessary to plug the well at or below the point of the rupture to bring it under control. In addition, drilling one or more relief wells may be necessary.

In addition to well rupture, other scenarios may require knowledge of well location. Numerous attempts have been made to provide accurate measurements of well location including surveying techniques which can give general information as to the location of a relief well with respect to a target well. These techniques may include range finding, i.e. determining the distance between a surface or uphole location and a downhole location.

Typical range finding systems include acoustic and magnetic range finding systems. In acoustic range finding (acoustic ranging) an electro-acoustic transducer transmits a pulse of acoustic energy towards a surface whose distance is to be measured, and subsequent signals received from the transducer are monitored to determine the temporal location of an echo from that surface.

Magnetic range finding (magnetic ranging) include passive and active magnetic ranging. Passive magnetic ranging uses a standard measurement while drilling (MWD) sensor set, to detect changes in the background magnetic field. These changes are affected by the distance from the magnetic source and the polarity of the influence which changes with every casing joint of a wellbore. It is possible then to observe the influence from several positions and 'triangulate' the location of the centreline of the well from the results.

Active magnetic ranging uses a power source downhole to inject current into the surrounding formation. The current passes through the high resistance formation into the lower resistance steel casing or lining of a well. Current in the steel induces a cylindrical magnetic field around the steel. This active magnetic induction can be detected from some distance, circa 30 m/100 feet. While active magnetic ranging is more accurate than passive magnetic ranging, a downhole trip is required to inject current.

An active ranging while drilling (ARWD) tool is also available which provides for active magnetic ranging capabilities on a normal drilling assembly. A magnetic field is detected using a set of three magnetometers arranged in a ring and set at 120 degrees to each other. The collected magnetic readings are used to provide an estimate of distance.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the disclosure may or may not address one or more of the background issues.

SUMMARY

An aspect of the present disclosure relates to a method for range finding, the method comprising:
  determining a first optical signature of a spool of optical fibre wound in a winding pattern which comprises repeated changes in a winding parameter to provide a different optical response such that the signature comprises a plurality of markers representing each change in the winding parameter;
  despooling the fibre from the spool;
  determining a second optical signature of the spool of optical fibre after despooling the fibre from the spool; and
  calculating the length of despooled fibre based on a comparison of the first and the second optical signatures.

The described method provides a simple method of range finding. Only a spool of optical fibre may be used in the method for range finding. Determining the optical signature of the spool may require few electronic components. As such, the spool of optical fibre and electronic components may be transportable to a variety of location for range finding. Furthermore, the spool of optical fibre may be replaced within another spool of optical fibre wound in a winding pattern which comprises repeated change in a winding parameter to provide a different optical response such that the signature comprises a plurality of markers representing each change in the winding pattern. Thus, the method may be robust and easily performed in a wide variety of applications.

Determining a length of despooled fibre may be used to determine the location of the spool. Fibre may be despooled from the spool upon deployment of the spool in a bore, e.g. a wellbore of a well. Thus, determining a length of despooled fibre may provide the location, e.g. depth, of the spool within the bore. In particular, the depth of the spool within the wellbore may be determined.

The described method for range finding calculates the length of despooled fibre based on a comparison of the first and second optical signatures. Like the first optical signature, the second optical signature comprises a plurality of markers representing each change in the winding parameter. As such, the comparison represents a simple comparison of the markers of the first and second optical signatures. This provides a non-complex calculation of determining a number of markers no longer or a number of markers still present. The number of markers may be determined by human visual inspection or machine determination. Thus, the described method does not require complex electronics or processing equipment. This may reduce time and costs associated with range finding. The described method may accordingly provide a simple and robust method of range finding.

Calculating the length may comprise comparing the plurality of markers of the first optical signature and the plurality of markers of the second optical signature. As the markers of both optical signatures represent changes in winding parameters, comparison the markers may be used to calculated the length of fibre despooled from the spool.

Comparing may comprise at least one of determining the plurality of markers no longer present in the second optical signature; and determining the plurality of markers still present in the first optical signature. As previously stated, this may be determined by human visual inspection or machine determination. Thus, complex electronics or processing equipment may not be required. This may reduce time and costs associated with range finding, and/or provide a simple and robust method of range finding.

Calculating the length may comprise correlating the plurality of markers with known lengths of optical fibre. The lengths of optical fibre may be controlled lengths of optical fibre. The known lengths of optical fibre may correspond to the lengths of wrap segments of optical fibre. Each wrap segment may have the same known length. Calculating the length of despooled fibre may comprise multiplying the number of marks no longer present by a known length of optical fibre, for example, a known length of each wrap segment of optical fibre.

Determining the either one or both of optical signatures may comprise injecting a laser pulse into the optical fibre and monitoring reflections or backscatter. Reflections or backscatter may be created by interactions with the optical fibre. The interactions may change depending on the angle of the optical fibre. Accordingly, changes in the winding parameter which result in changes in the angle of the optical fibre may change the interactions of the laser injected into the optical fibre. The changes in the interactions, reflections or backscatter are visible in the optical signature as markers. Repeated changes in the winding parameter may result in repeated changes in the interactions, reflections or backscatter and accordingly, repeated markers in the optical signature. The angle of the optical fibre relative to the laser pulse injected into the optical fibre may not change in optical fibre that has despooled from the spool. Thus, the markers may no longer visible or may be less visible in the despooled optical fibre when compared with the optical signature within remaining spooled fibre. Accordingly, determining the number of markers which are no longer present in the optical signature may be used to determine the length of despooled optical fibre.

As previously stated, the winding pattern comprises repeated changes in a winding parameter. The winding parameter may comprise a winding pitch or pitch angle. The winding pitch may be defined as the angle of an individual turn (or wrap) of optical fibre around the spool with respect to a spool axis. The spool axis may be the longitudinal axis of the spool. As will be appreciated, the winding pitch may range between almost 0 and almost 90 degrees. A steep winding pitch may define a larger angle relative to the spool axis, whereas a shallow winding pitch may define a smaller angle relative to the spool axis. A steeper winding pitch may provide more individual turns of the optical fibre per unit axial spool length, whereas a shallower winding pitch may provide a lower number of individual turns per unit axial spool length.

The winding parameter may comprise repeated changes in winding pitch resulting in an open or closed winding. A winding pitch which provides adjacent fibres turns or wraps which are axially separated may be defined as an open winding pitch. A winding pitch which provides adjacent fibre turns or wraps in engagement with each other may be defined as a closed winding pitch.

The winding parameter may comprise a winding radius. A winding radius may be defined as the radius of an individual turn (or wrap) of optical fibre around the spool. The winding radius may be changed by varying the configuration of the spool, in particular, the spool radius. For example, the radius of the spool may be varied in a sloped or linear manner to create an increasing or decreasing spool radius which may result in a changing winding radius. The radius of the spool may be varied in a step-wise manner to create instantaneous changes to the spool radius which may result in a changing winding radius.

A change in the winding radius may comprise a result of a change in the spool radius. The winding parameter may comprise a winding pitch. A change in the winding pitch may be a result of a change in a configuration or surface of the spool. For example, the spool may have varying grooves in the surface of the spool such that optical fibre is wound at a winding pitch for a length optical fibre, then wound at a different winding pitch for another length of optical fibre.

The winding parameter may comprise a winding tension or pressure. A winding tension or pressure may be the tension or pressure applied to the spool upon winding an individual turn (or wrap) of optical fibre around the spool. The winding tension or pressure may be changed in the winding process. Altering the winding tension or pressure may influence the level of slippage of the turn (or wrap) on the spool, and accordingly effect despooling of the specific turn (or wrap).

The winding parameter may comprise a twist imparted in the optical fibre during winding. A twist may be applied to an individual turn (or wrap) of optical fibre as the turn is wound on the spool. Following or preceding turns (or wraps) may be twisted in a different direction. For example, a turn may be twisted in a clockwise direction relative to the spool axis as the turn is wound on the spool, and the following turn may be twisted in a counter clockwise direction relative to the spool axis.

The winding parameter may comprise a winding speed. The winding speed may be defined as the speed at which optical fibre is wound on the spool. Accordingly, an individual turn (or wrap) of optical fibre may be wound around the spool at a particular winding speed, and another turn (or wrap) of optical fibre may be wound around the spool at a slower or faster speed.

The described winding parameters may be combined. For example, repeated changes to the winding angle and winding radius may be present in the optical fibre.

The optical fibre may function as a sensing element. The optical fibre may be connected to a surface device. The surface device may comprise a light source. The light source may be configured to send light along the optical fibre. The light source may be a laser source. The laser source may send a laser pulse along the optical fibre. The surface device may be an optical time-domain reflectometer (OTDR) used to measure the total length of the optical fibre by looking for light reflection from despooled optical fibre. The surface device may analyse back scatter along the length of the optical fibre. The surface device may detect and measure the intensity of the reflected light from the laser pulse through the optical fibre.

The light source may by located in a surface device. The surface device may be located at the surface. The light source may comprise a laser. The surface device may comprises surface interrogator of the type that may be used with fibre optic systems. For example, the light source may generate a light or laser pulse at a desired frequency through the optical fibre which may then be backscattered to a device, for example the surface interrogator. The surface interrogator may comprise a processor, memory and/or software for analysing the received signals and deriving useful data such as the temperature, pressure, acoustics and the like at a region of the line deployed within the wellbore. In particular, the surface interrogator may determine the optical signature of the spool of optical fibre.

The optical signature of the sensing element s changes as the optical fibre (sensing element) is despooled from the spool. The optical signatures each comprise markers where each marker may correspond to the different optical response and each optical response corresponds to a change in the winding parameter.

Determining the second optical signature and despooling the fibre from the spool may occur at the same time, i.e. simultaneously. Determining the second optical signature, despooling the fibre from the spool, and/or calculating the length may occur at the same time, i.e. simultaneously, and/or continuously. At least two of determining the second optical signature, despooling the fibre from the spool, and calculating the length may occur or be performed simultaneously.

Determining the optical signature may comprise determining the optical signature by distributed sensing including distributed temperature sensing (DTS), distributed pressure sensing (DPS) or distributed acoustic sensing (DAS). Distributed sensing may provide an optical signature along the entire length of optical fibre, or along the entire length of despooled optical fibre.

The optical signature may be the coherent Rayleigh backscatter noise signature in the optical fibre.

Determining the optical signature may comprise sending a laser pulse along the optical fibre and measuring resulting reflected radiation. The radiation may be light. Measuring the reflected radiation may comprise monitoring a returning backscatter signal. The returning backscatter signal may be the coherent Rayleigh backscatter noise signature in the optical fibre. Monitoring may comprise determining changes between laser pulses sent along the optical fibre.

The winding pattern of the optical fibre may be formed during winding of the optical fibre on the spool.

In particular, the winding parameter may be repeatedly changed during winding of the optical fibre on the fibre. The winding pattern may be formed by multiple turns (or wraps) of optical fibre wound on the bobbin. As previously stated, the winding pattern may comprise at least one of a winding pitch, winding radius, winding tension or pressure, twist, and winding speed. Accordingly, the winding pattern may be formed by a single or multiple turns (or wraps) of optical fibre being wound on the bobbin with, for example, a variety of winding pitches. The winding pattern of the optical fibre on the spool may be formed by individual or multiple turns (or wraps) of optical fibre wound axially along the spool axis at one winding pitch, and then other individual or multiple turns (or wraps) wound axially along the spool axis at another winding pitch. This process may be repeated such that the changing winding parameter (in this example winding pitch) is repeated.

While the winding pattern has been described in relation to the winding pitch, other described winding parameters may be changed. The winding pattern of the optical fibre on the spool may be formed by individual or multiple turns (or wraps) of optical fibre wound axially along the spool axis at a winding pressure or tension, and then other individual or multiple turns (or wraps) wound axially along the spool axis at another winding pressure or tension. This process may be repeated such that the changing winding parameter (in this example winding pressure or tension) is repeated.

During a change in the winding parameter, the optical response of the optical fibre changes resulting a visible marker in the optical signature of the optical fibre. The optical response of the optical fibre is related to the winding parameter of the optical fibre relative to a bore in which the spool is deployed. Thus, when the winding parameter changes relative to the bore in which the spool is deployed, the optical response changes. Repeated changes in winding parameter result in repeated optical response changes which are visible as markers in the optical signature.

As each marker corresponds to a change in the winding parameter, the number of markers no longer present in the optical signature corresponds with the length of optical fibre despooled from the spool. The length of optical fibre between adjacent changes in the winding parameter may be known such that the length of optical fibre between markers in the optical response is known. Accordingly, determining the number of missing markers may be used to determine the length of optical fibre despooled from the spool.

For example, the winding parameter may be changed every 100 meters of optical fibre wound on the spool. Thus, the distance between adjacent markers on the optical signature represents a length of 100 meters of optical fibre. The full length of the optical fibre may 1000 meters. Thus, the total number of markers present on the optical signature of the optical fibre may be 10 (1 marker for each 100 meters). An optical signature having 6 markers therefore indicates that 4 markers are no longer present and accordingly 400 meters of optical fibre has been despooled from the spool.

The length of optical fibre despooled from the spool may be calculated in real-time as the optical fibre is despooled from the spool. Furthermore, a rate of despooling may be calculated based on a difference in the length of optical fibre over a time period or interval.

As previously described, the winding parameter may be a winding radius. Thus, repeated changes of the winding radius during winding of the optical fibre on the spool may result in a particular optical signature of the spool of optical fibre. The changing winding radius relative to the bore in which the spool is deployed as the optical fibre is unwound from the spool results in the optical response changing. The repeated changes to the winding radius relative to the bore are visible as markers in the optical signature.

In another example, the winding parameter is a winding pitch. When the winding pitch changes relative to the bore in which the spool is deployed, the optical response of the optical fibre changes. The changing winding pitch may result in a changing angle of the optical fibre relative to the bore as the optical fibre is unwound from the spool. The repeated changes to the winding pitch relative to the bore are visible as markers in the optical signature.

The winding pattern of the optical fibre on the bobbin may be formed by a plurality of wrap segments arranged axially along a spool axis of the spool. Wrap segments may comprise multiple wraps or turns of optical fibre wound on the spool. The spool axis may also define a bobbin axis of the bobbin. Different wrap segments may be have the same or uniform lengths of optical fibre.

The wrap segments may include individual wraps or turns of optical fibre which are wrapped at a winding pitch. In this respect the winding pitch may be defined as the angle of an individual wrap with reference to the spool axis. A steep winding pitch may define a larger angle relative to the spool axis (i.e. more towards perpendicular), whereas a shallow winding pitch may define a smaller angle relative to the spool axis (i.e. more towards parallel). A steeper winding pitch may provide more individual turns or wraps of the fibre per unit axial spool length, whereas a shallower winding pitch may provide a lower number of individual turns or wraps per unit axial spool length. A winding pitch which provides adjacent fibre turns or wraps in engagement with each other may be defined as a closed winding pitch. Adjacent fibres which are axially separated may define an open winding pitch.

The changes in winding pitch may occur at repeating or non-repeating intervals or lengths of optical fibre between wrap segments. The repeating intervals may be the same or vary. The changes in winding pitch may be consistent between wrap segments or may vary between wrap segments. A transition from one wrap segment to another wrap segment may be provided by a change in winding pitch. A change in winding pitch may comprise a change between shallow windings of optical fibre around the spool and tighter windings of optical fibre around the bobbin. Shallow windings may be more closely aligned with a spool axis of the spool and tighter windings may be more transverse.

The change in winding pitch between adjacent wrap segments may correspond to a marker in the optical signature. As such, repeatedly changing winding pitches between adjacent wrap segments results in repeated markers in the optical signature. The length of optical fibre between changes in winding pitch may be known and set during spooling of the optical fibre on the spool. In particular, the length may be set by winding the optical fibre on the spool at a particular winding pitch for a particular known length of optical fibre, then changing the winding the pitch for a particular known length of optical and repeating this process until the entire length of optical fibre is wrapped on the spool. As previously stated, the lengths between changes in the winding parameter, in this example winding pitch, may be repeated (i.e. uniform) between the wrap segments.

Adjacent wrap segments may partially overlay in the axial direction. A wrap segment may be wound on the spool for an axial length of the spool, and another wrap segment may be wound on the spool and partially overlay the wrap segment. The two wrap segments may be adjacent. One wrap segment may completely overlay a wrap segment. In this configuration the overlaid wrap segment may be completed overlaid by a wrap segment.

A wrap segment may be wound in a first axial direction, and then an adjacent wrap segment may be wound in a second axial direction. The second axial direction may be generally opposite the first axial direction. Alternatively, wraps segments may be wound in the same direction, but with a change to winding parameter, e.g. winding pitch, Each wrap segment may comprise a first wrap layer wound in a first axial direction over a first axial distance, and a second wrap layer wound over the first wrap layer in a reverse second axial direction over a second axial distance greater than the first axial distance. The optical fibre may extend from the second wrap layer of one wrap segment to the first wrap layer of an adjacent wrap segment.

In some examples the transition of the optical fibre from the first wrap layer into the second wrap layer may be provided with a significant change, for example reduction, in winding pitch. The transition of the optical fibre from the first wrap layer into the second wrap layer may be provided with a change from a closed winding pitch to an open winding pitch.

In one example the first wrap layer of one or more, for example each, wrap segment may comprise a varying winding pitch. For example, the winding pitch may vary in an axial direction. The first wrap layer of one or more, for example each, wrap segment may comprise a uniform winding pitch. For example, the winding pitch may remain constant throughout the first wrap layer. In some examples the first wrap layer may comprise a closed winding pitch. This may facilitate maximising the length of fibre which is contained within the first wrap layer.

In one example the second wrap layer of one or more, for example each, wrap segment may comprise a uniform winding pitch. For example, the winding pitch may remain constant throughout the second wrap layer.

Despooling the fibre from the spool may comprise deploying the spool into a wellbore. The wellbore may include tubing or casing. Locating the spool may comprise deploying the spool in tubing or casing of a wellbore. Deploying the spool may comprise despooling optical fibre from the spool into the wellbore.

One end of the optical fibre may be fixed to a spool. Another end of the optical fibre may be fixed to a surface device or location. The spool may be deployed, lowered or fall in a hole. The optical fibre may fixed to an end of the spool such that the optical fibre is despooled from the spool as the spool is deployed, lowered or falls down the hole. The calculated length of despooled fibre may be used to determine a position or depth of the spool within the hole. The hole may be a wellbore of an oil and gas well.

The calculated length of despooled optical fibre may be used to determine a location of the spool in the wellbore. The method may further comprise determining a location of the spool based on the calculated length of despooled optical fibre.

Another aspect of the present disclosure relates to a computer readable medium having computer program code stored thereon, the computer program code when executed by a processor performing any of the described methods. The computer readable medium may be non-transitory.

The method may further comprise releasing the optical fibre once the length of despooled fibre has been calculated. The spool and optical may be disposable and left in the wellbore once the length has been calculated. Releasing the optical fibre may comprise cutting the optical fibre at a surface or subsurface location.

The spool and optical fibre may not need to be retrieved to the surface. Accordingly, the strength requirements of the spool and/or optical fibre may be substantially reduced, compared to when spool and fibre are intended to be retrievable. In such example, this may allow the use of optical fibre which has less strength, for example being bare or having minimal coating, than may otherwise be required if the spool and fibre were to be retrieved to surface.

The computer readable medium may form part of a computing device. The computing device may be a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computing device components to the processing unit. The computing device may also comprise networking capability using Ethernet, WiFi, and/or other network format, for connection to access shared or remote drives, one or more networked computers, or other networked devices.

The method may be performed in part by a device or apparatus. The device may be located at surface location. The device may be located uphole of the despooled spool. The device may comprise a processor and memory. The processor may be configured to perform the described method. The device may comprise computer-readable medium may comprise any suitable memory or storage device such as random-access memory (RAM), static RAM (SRAM), dynamic RAM (DRAM), non-volatile RAM (NVRAM), read-only memory (ROM), or Flash memory.

The processor may have a single-core processor or multiple core processors composed of a variety of materials.

The method may be performed by a single device at a single location, or by multiple elements are various locations. For example, a device located uphole of the spool of optical fibre may perform the step of determining the optical signature while other elements, such as devices, apparatus, controllers, processors and/or memory perform other method steps such as determining the number of markers no longer present and/or calculating the length of despooled fibre.

Range finding may be necessary during one or all phases of a well lifecycle such as appraisal, drilling, production and abandonment. The method may be performed to determine the location of a blockage within a wellbore or a rupture in a wellbore, specifically in the casing of a wellbore.

Features of the method may be derived from the description provided in accordance with any other aspect.

Another aspect of the present disclosure relates to a device for use with a spool of optical fibre for range finding, wherein the device is configured to:
  determine a first optical signature of the spool of optical fibre wound in a winding pattern which comprises repeated changes in winding pitch to provide a different optical response such that the signature comprises a plurality of markers representing each change in winding pitch;
  determine a second optical signature of the spool of optical fibre after fibre has been despooled from the spool; and
  calculate the length of despooled fibre based on a comparison of the first and second optical signatures.

The device may comprise a processor and memory. The memory may be any suitable memory such as random-access memory (RAM), static RAM (SRAM), dynamic RAM (DRAM), non-volatile RAM (NVRAM), read-only memory (ROM), or Flash memory.

The device may be configured for use at surface and/or uphole of the spool. The device may be located on the spool.

Another aspect of the present disclosure relates to a system for range finding for use in a wellbore, the system comprising:
  a device configured to:
    determine a first optical signature of a spool of optical fibre wound in a winding pattern which comprises repeated changes in winding pitch to provide a different optical response such that the signature comprises a plurality of markers representing each change in winding pitch;
    determine a second optical signature of the spool of optical fibre after fibre has been despooled from the spool; and
    calculate the length of despooled fibre based on a comparison of the first and second optical signatures; and
  the spool of optical fibre located downhole of the device.

The device may be configured for use at surface and/or uphole of the spool. The device may be located on the spool.

Features of the device or system may be derived from the description provided in accordance with any other aspect.

Another aspect of the present disclosure relates to a computer-readable medium comprising instructions that, when executed by a processor, perform any of the described methods.

The computer-readable medium may be non-transitory. The computer-readable medium may comprise storage media excluding propagating signals. The computer-readable medium may comprise any suitable memory or storage device such as random-access memory (RAM), static RAM (SRAM), dynamic RAM (DRAM), non-volatile RAM (NVRAM), read-only memory (ROM), or Flash memory.

The processor may have a single-core processor or multiple core processors.

Another aspect of the present disclosure relates to method of deploying optical fibre, the optical fibre wound in a winding pattern on a spool, the winding pattern comprising repeated changes in a winding parameter, the method comprising:
  determining a first optical signature of the spool of optical fibre, the signature comprising a plurality of markers representing each change in the winding parameter;
  deploying the spool in a wellbore such that optical fibre despools from the spool;
  determining a second optical signature of the spool of optical fibre after deploying the spool; and
  calculating the length of despooled optical fibre based on a comparison of the first and second optical signatures.

At least two of the steps of deploying the spool, determining the second optical signature and calculating the length may be performed or occur approximately simultaneously.

References to optical signature may include either one of or both of the first and second optical signatures unless specifically stated.

BRIEF DESCRIPTION OF THE DRAWINGS

These and other aspects of the present disclosure will now be described, by way of example only, with reference to the accompanying Figures, in which:

FIG. 20 is a flowchart of a method for range finding; and

FIGS. 21 to 25 provide sequential images of the optical signature of optical fibre the optical signature is despooled.

DETAILED DESCRIPTION OF THE DRAWINGS

Figure 1:
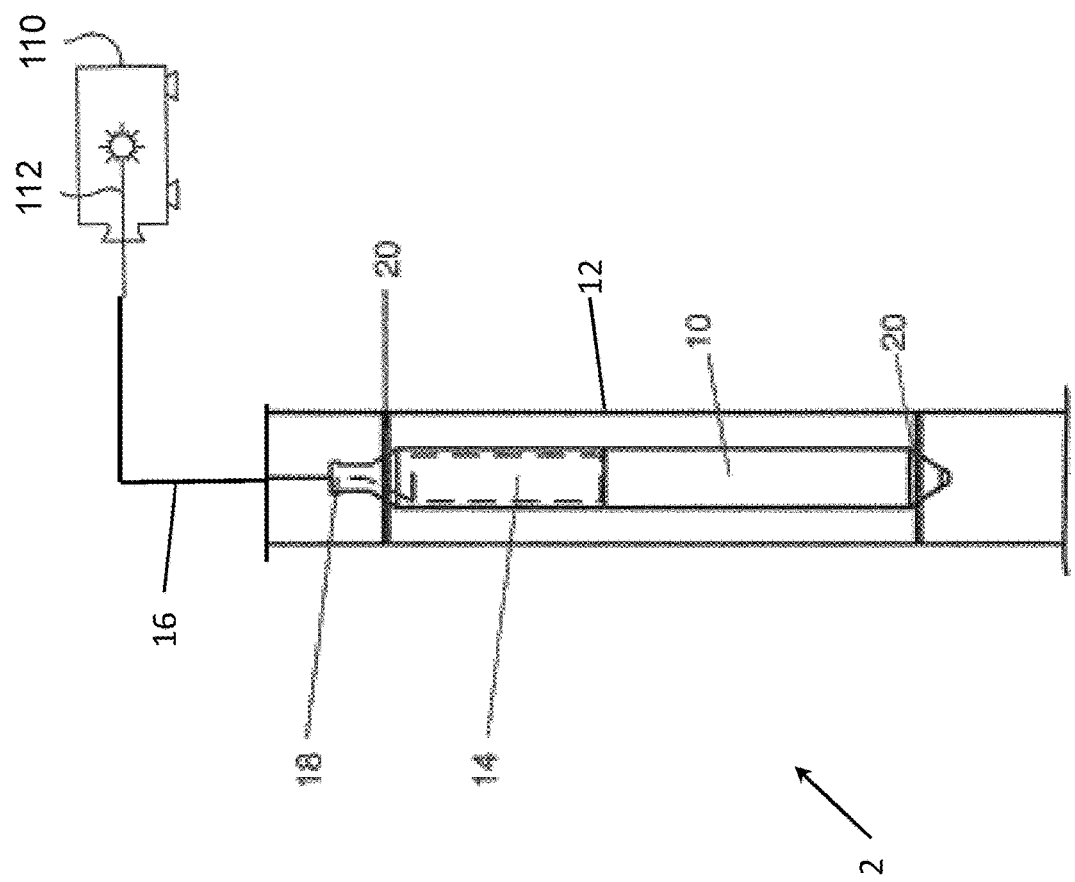
FIG. 1 is a diagrammatic illustration of a system for range finding.

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property might further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, or within less than 0.01% of the stated amount.

Aspects of the present disclosure relate to a method of range finding. The method comprises determining an optical signature of spool of optical fibre wound in a winding pattern which comprises repeated changes in winding pitch to provide a different optical response such that the signature comprises a plurality of markers representing each change in winding pitch. The spool is located at a location, for example, a downhole location in a wellbore. The number of markers no longer present after the spool is located are determined. Based on the number of markers no longer present, the length of despooled fibre is calculated.

FIG. 1 is a diagrammatic illustration of a system 2 for range finding for use in a wellbore. The system 2 comprises a device 10 deployed within a wellbore 12. The device 10 includes a spool 14 of optical fibre 16, such that as the device 10 traverses the wellbore 12 the fibre 16 is deployed from an exit 18 at the trailing end of the device 10. The fibre 16 may be used during or after deployment for multiple applications, such as for communication. In some examples the fibre 16 may be used for distributed sensing within the wellbore 12, such as distributed temperature sensing (DTS), distributed pressure sensing (DPS), distributed acoustic sensing (DAS), and/or the like.

The system 2 further comprises a surface device 110. The device 10 is connected via the optical fibre 16 to the surface device 110. In particular, the fibre 16 is connected at a first end 112 to the surface device 110.

The surface device 110 comprises a light source. The light source may be a laser source. The surface may 110 may be configured for use as an optical time-domain (OTDR) for use in measuring the total length of the optical fibre 16 by looking for light reflection from the deployed optical fibre 16. The range finder analyses back scatter along the length of the optical fibre 16.

The surface device 110 may further comprise an interrogator. In this way, the optical fibre 16 may be used for the purposes of distributed sensing, such as DTS, DPS and/or DAS. The surface interrogator is of the type used with fibre optic systems. The light source generates a light or laser pulse at a desired frequency through the optical fibre 16 which may then be backscattered to the surface interrogator. The surface interrogator then determines the optical signature of the optical fibre 16.

Figure 2:
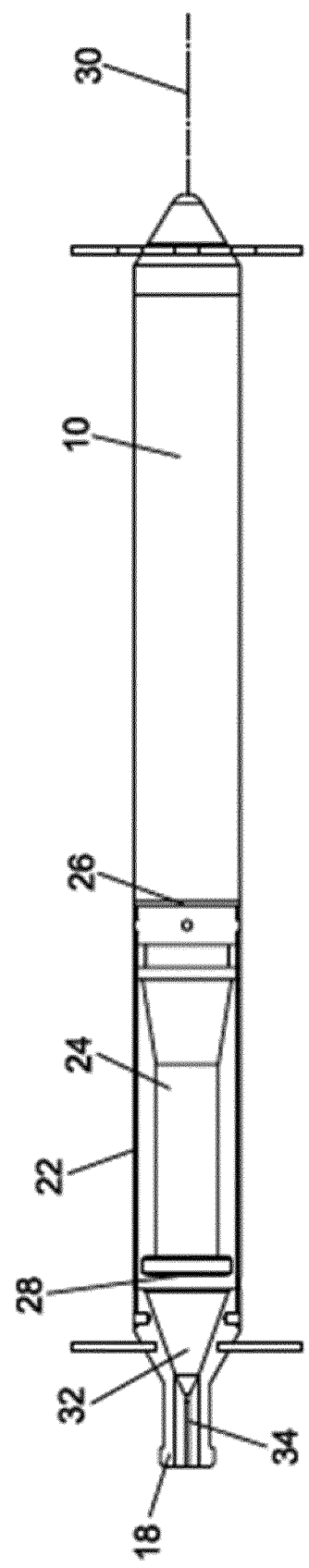
FIG. 2 is a part sectional view of a device of the system of FIG. 1, shown in side elevation.

The device 10 is shown in FIG. 2. The device 10 is generally cylindrical in form, and in the illustrated arrangement includes centralising elements 20 at opposing ends thereof for facilitating centralisation of the device 10 in the wellbore 12 (FIG. 1).

The device 10 comprises a cavity region 22 shown in cross-section, wherein the cavity region 22 accommodates the spool of optical fibre. A bobbin 24 of the spool is illustrated with no fibre wound thereon for clarity purposes. The bobbin 24 is mounted within the cavity 22 in cantilever form such that the bobbin 24 defines a fixed or proximal end 26 and a free or distal end 28, and arranged to be coaxial with the axis 30 of the device 10.

The device 10 includes an internal funnel 32 which functions to guide fibre despooled from the bobbin 24 towards the exit 18. The exit 18 includes a throughbore 34 which is dimensioned to a similar diameter as the fibre, and in some examples the bore 34 may provide a degree of resistance to fibre passing therethrough. This may assist to control the rate of fibre deployment. In some examples a volume of grease or similar material may be provided within the cavity 22, for example within the internal funnel 32. Such grease may become coated on a fibre during deployment from the device 10. The grease may function to provide a degree of resistance to the deployment of the fibre, to permit the fibre to stick to a wall of the wellbore 12, to protect the fibre, to provide lubrication to the fibre and the like.

The optical fibre 16 is wound on the bobbin 24 in a winding pattern which comprises repeated changes in winding pitch to provide a different optical response such that the optical signature of the optical fibre 16 comprises a plurality of markers representing each change in winding pitch.

Figure 4:
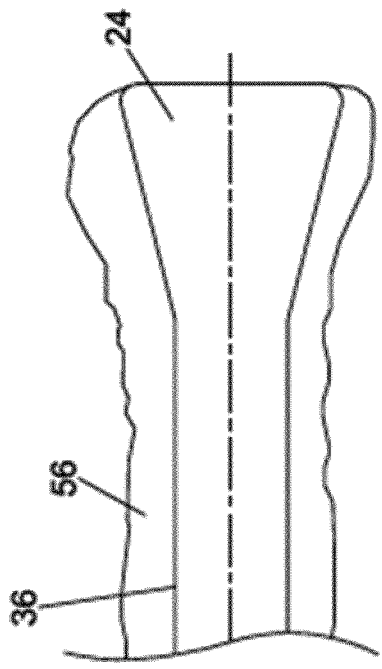
FIG. 4 is a simplified side elevation of the bobbin of FIG. 3 with grease.
Figure 3:
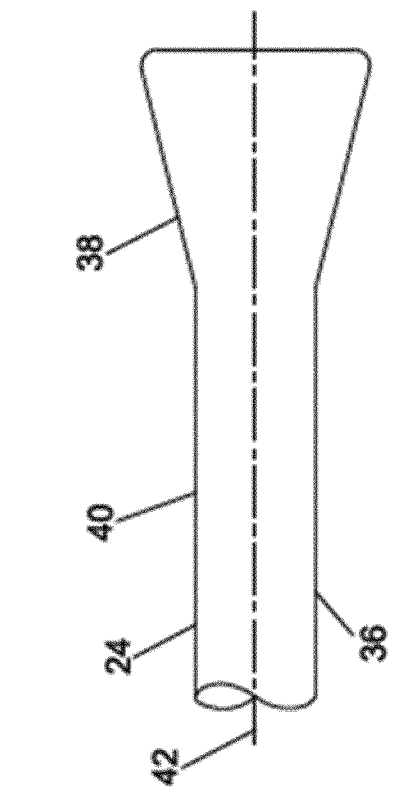
FIG. 3 is a simplified side elevation view of a bobbin of the device of FIG. 2.

Referring now to FIG. 3, the bobbin 24 is illustrated in simplified form, showing the conical and cylindrical portions 38, 40 of the winding surface 36, and the bobbin axis 42. Prior to winding optical fibre on the bobbin, grease 56 is applied over the winding surface 36 as shown in FIG. 4. Optical fibre wound onto the bobbin 24 will be pulled through the grease 56, such that the optical fibre becomes coated. Such an arrangement may facilitate easier coating of the fibre, rather than, for example, stripping the complete length of the fibre through a grease bath, although such an example alternative or supplemental way of applying grease may still be used. Any suitable grease may be used, or indeed any alternative coating material as required.

Figure 5:
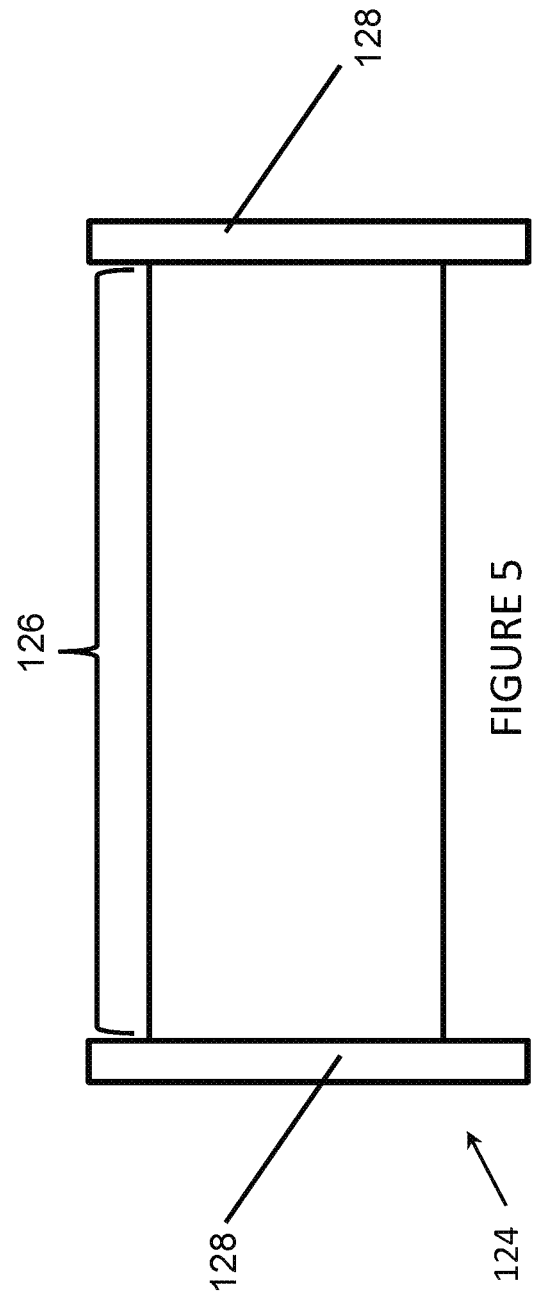
FIG. 5 is a simplified side elevation view of another embodiment of a bobbin of the device of FIG. 2.

While a particular bobbin 24 has been described, a person skilled in the art will appreciate that other configurations are possible. Another exemplary bobbin 124 is shown in FIG. 5. The bobbin 124 comprises a cylindrical portion 126. In contrast with the bobbin 24, the bobbin 124 does not comprise a conical portion. The optical fibre is simply wrapped around the cylindrical portion 126. The bobbin 124 further comprise flanges 128 on either longitudinal end of the cylindrical portion 126 to prevent optical fibre from inadvertently despooling or slipping off of the bobbin 126.

Figure 6:
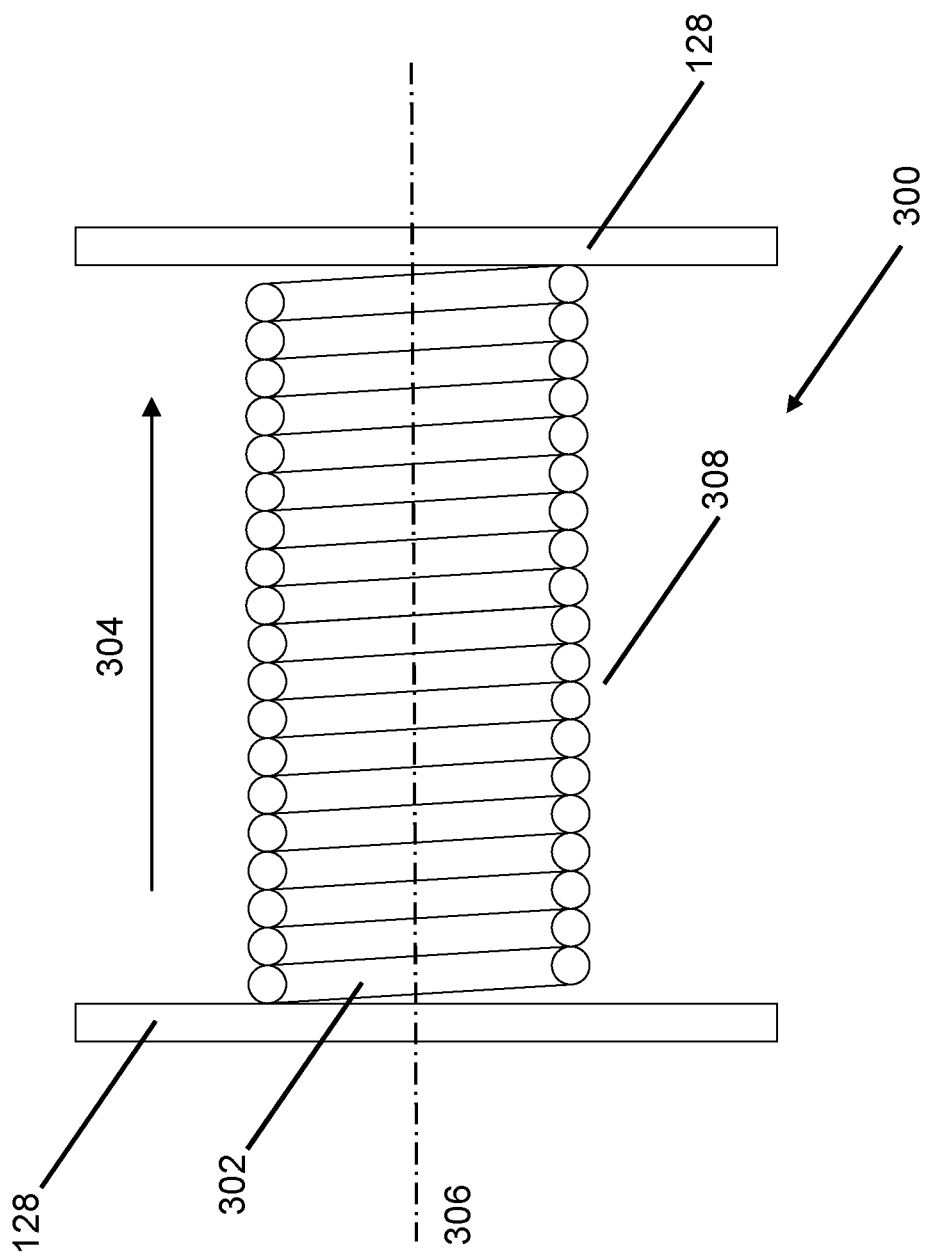
FIGS. 6 to 8 provide sequential stages in winding an optical fibre on the bobbin of FIG. 5.
Figure 7:
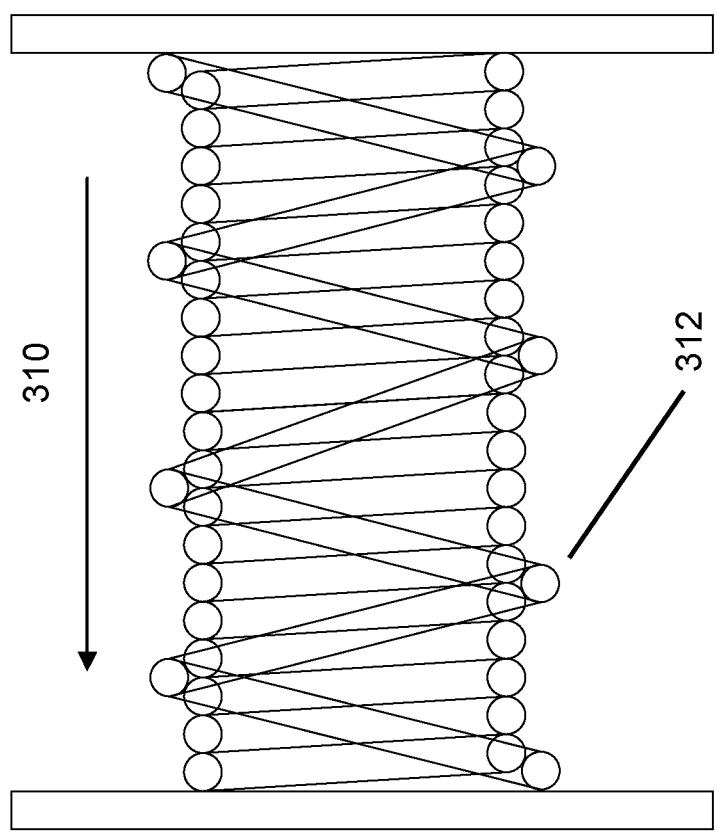
Figure 8:
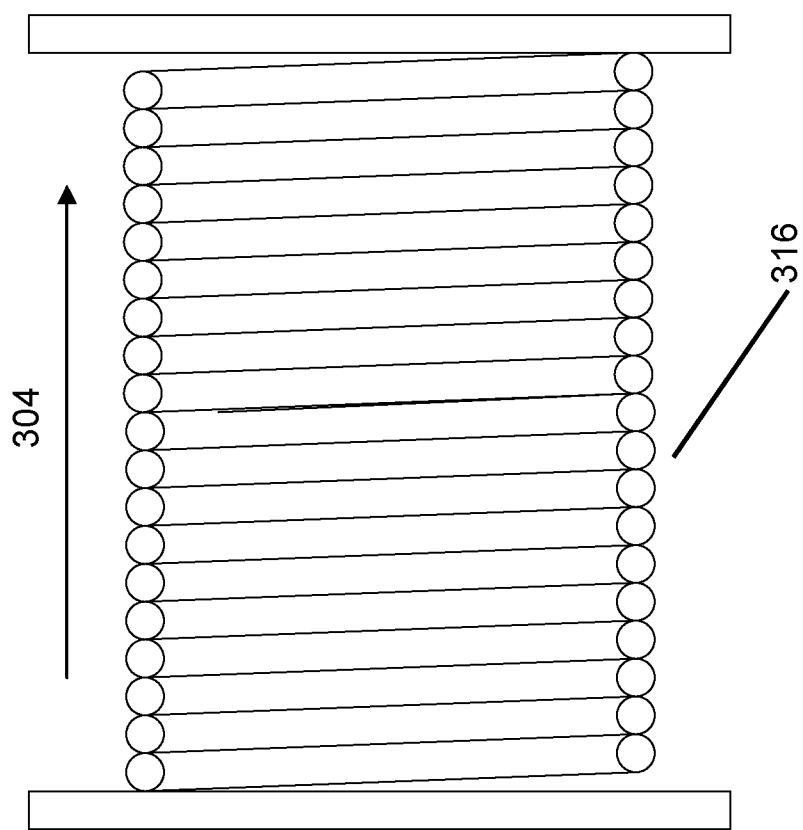

An exemplary winding 300 is shown in FIGS. 6 to 8. The initial winding stage of an optical fibre 302 in FIG. 6. In the illustrated arrangement, the optical fibre 302 is wound on the described bobbin 124. The fibre 302 is wound in a first axial direction, indicated by arrow 304, relative to the bobbin axis 306, which may also define a spool axis, to form a number of turns or wraps, at a steep winding pitch which provides the adjacent turns in contact with each other, i.e., a closed winding pitch. The fibre 302 is wound between flanges 128 of the bobbin 124. The turns or wraps of fibre 302 wound between the flanges 128 in the first direction 304 define a first wrap layer 308.

As shown in FIG. 7, the fibre 302 is then wound in a reverse second axial direction, illustrated by arrow 310, over the first wrap layer 308 at a much shallower winding pitch. In addition, the fibre 302 is wound such that adjacent turns are not in contact with each (i.e. an open winding pitch). The fibre 302 is wound between flanges 128. The turns or wraps of fibre 302 wound between the flanges 128 in the second direction 310 define a second wrap layer 312. The second wrap layer 312 partially overlays the first wrap layer 308.

As shown in FIG. 8, the fibre 302 is then wound in the first axial direction illustrated by arrow 304, over the first second wrap layer 312 at a much steeper winding pitcher. In addition, the fibre 302 is wound such that adjacent turns are in contact with each (i.e. a closed winding pitch). The fibre 302 is wound between flanges 128 of the bobbin 124. The turns or wraps of fibre 302 wound between the flanges 128 in the first direction 304 define a third wrap layer 316. The third wrap layer 316 completely overlays the second wrap layer 312.

The process illustrated in FIGS. 6 to 8 is repeated until the entire length of optical fibre 302 is wound on the bobbin 124.

The optical fibre 302 of the first wrap layer 308 accordingly has a first winding pitch relative to wellbore 12 in which the device 10 is deployed, while the second wrap layer 312 has a second winding pitch. Similarly, the third wrap layer 316 has a third winding pitch. The first and second winding pitches are not equal. However, the third winding pitch is equal to the first winding pitch.

The repeated changes in winding pitch between the turns of the optical fibre 302 provide different optical responses such that an optical signature of the optical fibre 302 wound on the bobbin 124 comprises a plurality of markers. As will be described, determining the number of markers no longer present in the optical signature may be used to calculate a length of despooled optical fibre 302 from the bobbin 124. As will be appreciated, the number of markers still present could alternatively or additionally be used to calculate a length of despooled optical fibre 302.

Figure 9:
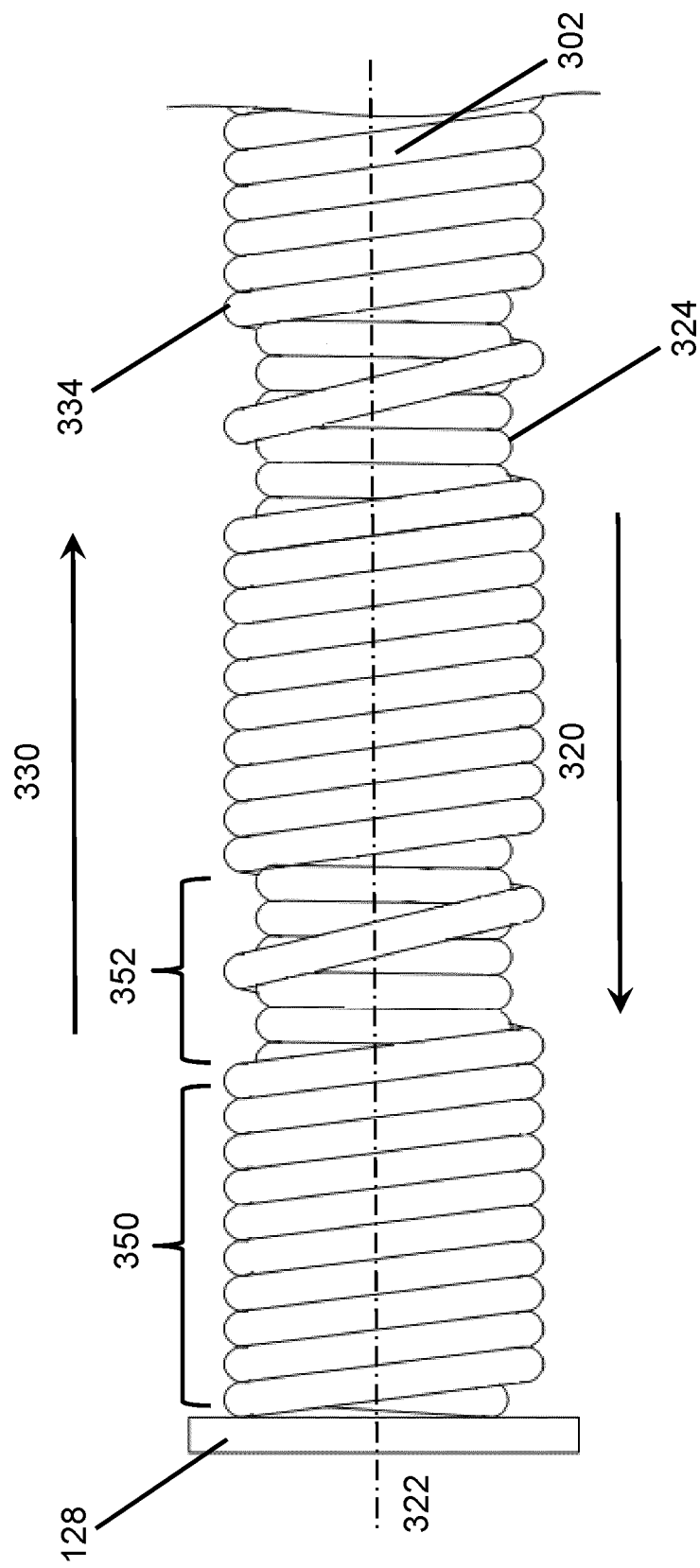
FIG. 9 provides a stage in winding an optical fibre on the bobbin of FIG. 5.

While a particular winding of optical fibre 16 has been described, a person skilled in the art will appreciate that other winding are possible. Another exemplary winding of a length of optical fibre 16 is shown in FIG. 9. As illustrated in FIG. 9, the optical fibre 302 is wound on the described bobbin 214. The fibre 302 is wound in a first axial direction indicated by arrow 320, relative to the bobbin axis 322, which may also define a spool axis, to form a number of turns or wraps, to a flange 128 of the bobbin 124. The turns or wraps are wound at a steep winding pitch and adjacent turns are in contact with each, i.e. a closed winding pitch. The turns or wraps of fibre 302 in the direction 320 define a first wrap layer 324.

The optical fibre 302 is then wound in a reverse second axial direction, illustrated by arrow 330, over the first wrap layer 324. The turns or wraps of fibre 302 wound in the second direction 330 define a second wrap layer 334. The winding pitch of the turns of the second wrap layer 334 are shallower than the winding pitch of the turns of the first wrap layer 324.

During winding of the turns of the second wrap layer 334 in the second direction 330, adjacent turns are initially in contact with each, i.e. a closed winding pitch, to define a closed portion 350 then turns are separated from each other such that they are not entirely in contact with each, i.e. an open winding pitch to define an open portion 352. The closed portion 350 and open portion 352 are then repeated in a pattern. FIG. 9 clearly illustrates that different winding parameters, e.g. variations in the winding pitch or pitch angle, and open or closed winding pitch variations, may be combined. The repeated changes in winding pitch e.g. steep or shallow, between turns of the optical fibre 302 provide different optical responses such that an optical signature of the optical fibre 302 wound on the bobbin 124 comprises a plurality of markers. As will be described, determining the number of markers no longer present in the optical signature may be used to calculate a length of despooled optical fibre 302 from the bobbin 124.

Figure 10:
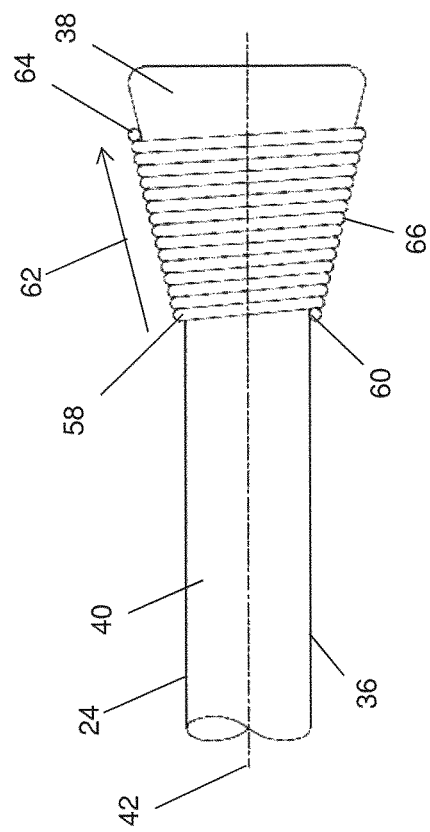

While particular windings of optical fibre 16 has been described, a person skilled in the art will appreciate that other winding are possible. Another exemplary sequence of winding a length of optical fibre 16 is shown in FIGS. 10 to 19. The initial winding stage of an optical fibre 58 is illustrated in FIG. 10, with the grease coating 56 not shown for clarity. The fibre 58 is then wound in a first axial direction, indicated by arrow 62, relative to the bobbin axis 42 (which may also define a spool axis) to form a number of adjacent individual turns or wraps, at a steep winding pitch which provides the adjacent wraps in contact with each other (i.e., a closed winding pitch). In the present case the first axial direction is such that the fibre 58 is added to the bobbin 24 in an upslope direction of the conical portion 38, until reaching point 64, thus defining a first wrap layer 66. By winding in an upslope direction each wrap or turn provides support to the subsequent wound wrap or turn of the fibre 58.

Figure 11:
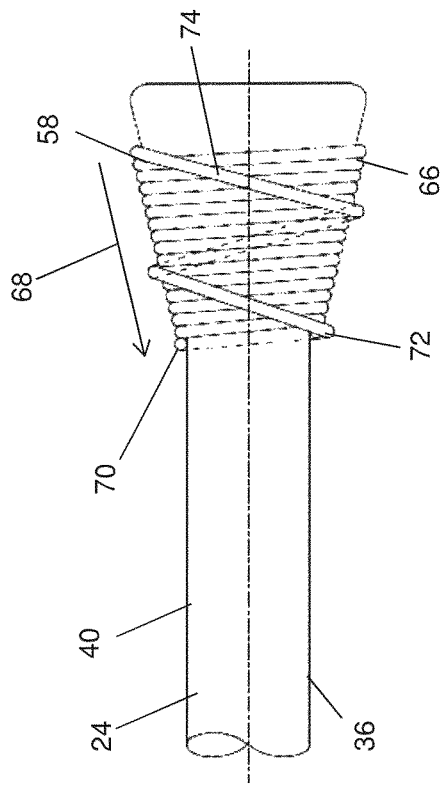
FIGS. 10 to 19 provide sequential stages in winding an optical fibre on the bobbin of FIGS. 3 and 4.
Figure 12:
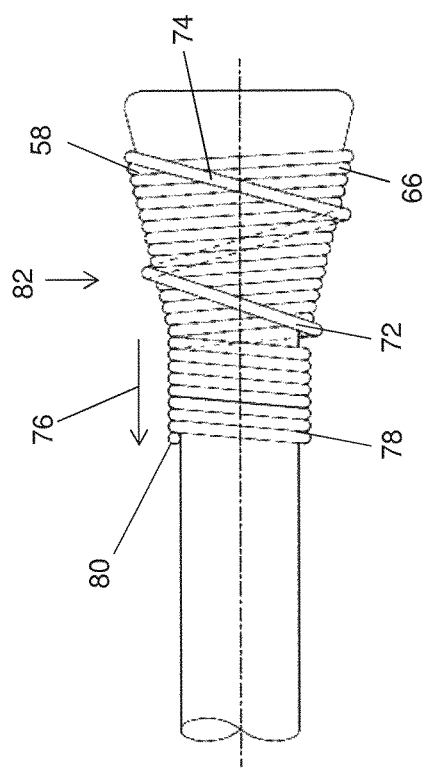
Figure 15:
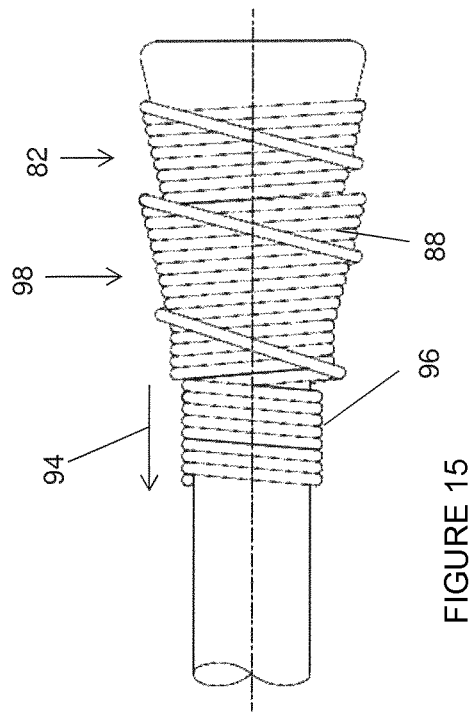
Figure 17:
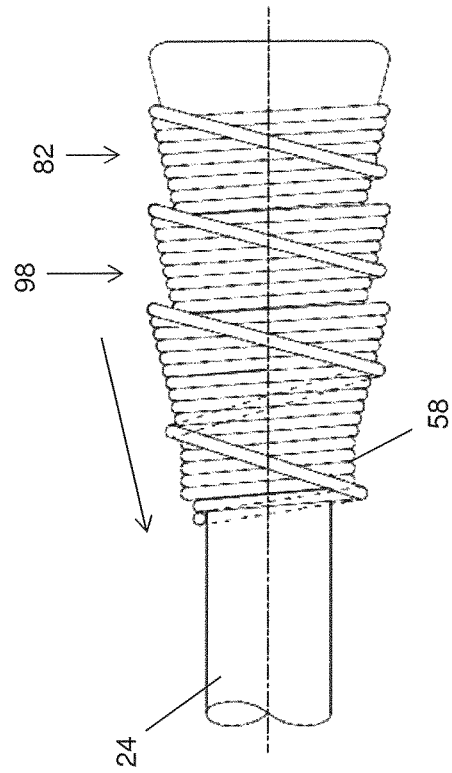

As shown in FIG. 11, the fibre 58 is then wound in a reverse second axial direction, illustrated by arrow 68, over the first wrap layer 66 at a much shallower winding pitch, until reaching point 70 where the fibre 58 is on the cylindrical portion 40 of the winding surface 36, adjacent the starting point of the first wrap layer 66. This may form a first portion 72 of a second wrap layer 74. Following this, as shown in FIG. 12, winding of the fibre 58 is continued further in the second axial direction, illustrated by arrow 76, to form a second portion 78 of the second wrap layer 74, until reaching point 80. The second portion 78 of the second wrap layer 74 is wound at a steeper winding pitch (in this case a closed winding pitch) relative to the first portion 72 of the second wrap layer 74. The second portion 78 may function to provide support to the first wrap layer, and as such in some cases the second portion 78 may be defined as an anchor or anchor winding portion. The first and second wrap layers 66, 74 may form a first wrap segment 82.

Figure 13:
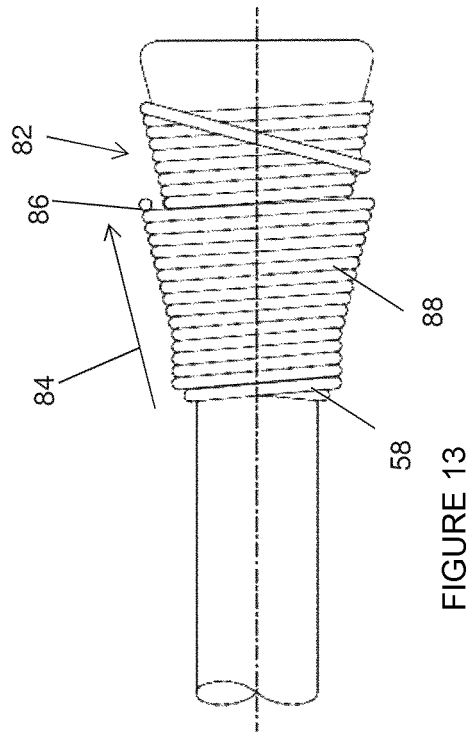
Figure 14:
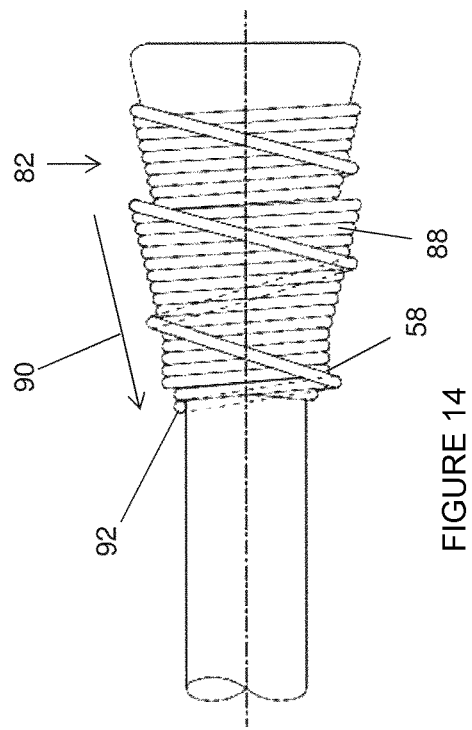
Figure 16:
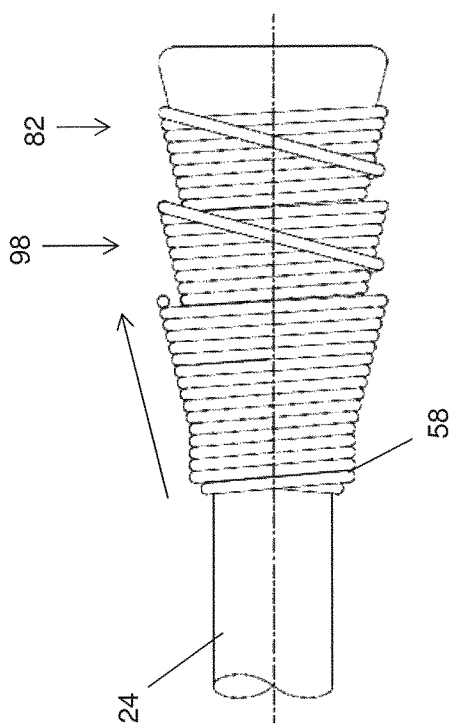

Following this, as illustrated in FIG. 13, the fibre 58 is wound again in the first direction, illustrated by arrow 84, over the first wrap segment 82, at a closed wind pitch until reaching point 86 to form a subsequent first layer 88. Next, as illustrated in FIG. 14, the fibre 58 is wound in the direction of arrow 90, at a shallower winding pitch over the first layer 88 until reaching point 92, with the fibre 58 continuing to be wound in the direction of arrow 94 in FIG. 15 to complete a second wrap layer 96. The newly formed first and second wrap layers 88, 96 define a second wrap segment 98 which axially overlaps the first wrap segment 88, wherein each wrap segment extends to a common outer diameter.

The winding process may be continued in the same manner, as illustrated in FIGS. 16 to 19 to add further axially overlapping wrap segments (e.g., segment 100), each with first and second wrap layers, distributed along the length of the bobbin 24. The winding process may be continued until the required length of fibre 58 has been wound onto the bobbin 24 to form a complete spool. In some examples between 10 to 10,000 meters, and possibly more, of fibre 58 may be wound onto the bobbin 24, perhaps over 2 to 300, and possibly more, axially overlapping wrap segments.

Figure 19:
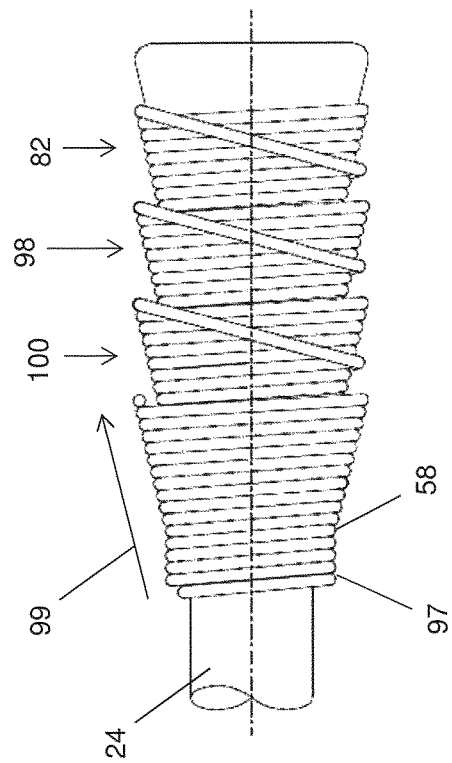
Figure 18:
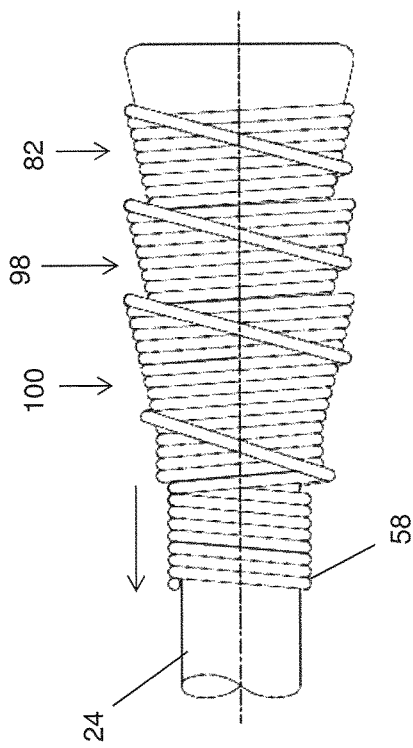

The winding of the fibre 58 may be completed by winding a final wrap layer 97 in the direction of arrow 99 shown in FIG. 19.

The provision of partially overlapping wrap segments may be such that at least a proportion of one wrap segment is supported or constrained by the overlapping adjacent segment. Further, the multiple adjacent and overlapping segments may provide a degree of resistance to being disturbed by any object, such as the despooled portion of the fibre, dragging thereacross. Also, the supporting effect of the overlapping segments may be such that any requirement for end flanges may be minimised or eliminated.

While exemplary windings have been described, a person skilled in the art will appreciate that other windings are possible. Other windings of optical fibre 16 on the bobbin 24 in which the winding pattern comprises repeated changes in winding pitch besides the winding patterns described may be used.

Use of the system 2 will now be described. FIG. 20 shows a flowchart of a method 200 for range finding. The method comprises deploying 202 the device 10 into the wellbore 12. Deploying 202 the device 10 comprises deploying the bobbin 24 in the wellbore while the optical fibre 16 is connected to the surface device 110. As the bobbin 24 is deployed or located in the wellbore 12, the optical fibre 16 despools from the bobbin 24.

As the device 10 is deployed, the surface device 110 determines 204 the optical signature of the optical fibre 16. Determining 204 the optical signature comprises sending a light or laser pulse from the surface device 110 along the optical fibre 16 and monitoring a returning backscatter signal. The optical signature is determines by DAS; however, DTS or DPS may alternatively or additionally be used.

The surface device 110 determines 206 a number of markers no longer present in the optical signature. Alternatively or additionally, the surface device 110 may determine a number of markers still present in the optical signature. Generally, the surface 110 device compares an optical signature (a first optical signature) before deploying 202 the device (before optical fibre 16 despools from the bobbin 24) with an optical signature (a second optical signature) after deploying 202 the device (after optical fibre 16 despools from the bobbin 24). Each marker in the optical signature corresponds to a change in a winding parameter. Changes in the winding parameter occur between known length of the optical fibre 16 wound around the bobbin 24. The winding parameter may be a winding pitch. Accordingly, the optical fibre 16 may be wound on a spool as described in reference to FIGS. 6 to 8, 9, or 10 to 19.

Based on the number of markers no longer present, the length of optical fibre 16 deployed is calculated 208.

An example of the optical signature of the optical fibre 16 as the optical fibre is despooled is shown in FIGS. 21 to 25. In FIG. 21, the optical signature of the spool of optical fibre is shown at time t0. This may correspond to a first optical signature. The light source generates a light or laser pulse through the optical fibre which is backscatter to the surface interrogator. The surface interrogator determines the optical signature of the optical fibre which comprises a plurality of markers. One of the markers is identified as M, i.e. a "dash". At this initial time t0, all of the markers representing each change in a winding parameter are present as the optical fibre is fully wound on the spool or bobbin. As all markers are present, no optical fibre has despooled from the spool. In this example, the winding parameter comprises the winding pitch.

In FIG. 22, the device is deployed at a wellbore. In particular, the spool is deployed in the wellbore. This may involve dropping the spool with fully wound optical fibre in the wellbore such that the optical fibre despools from the spool as the spool descends downhole. As this time t1, all of the markers representing each change in winding pitch are present as the optical fibre is still fully wound on the spool or bobbin. Time t1 may be equal to or greater than time t0. As all markers are present, no optical fibre has despooled from the spool.

Figure 23:
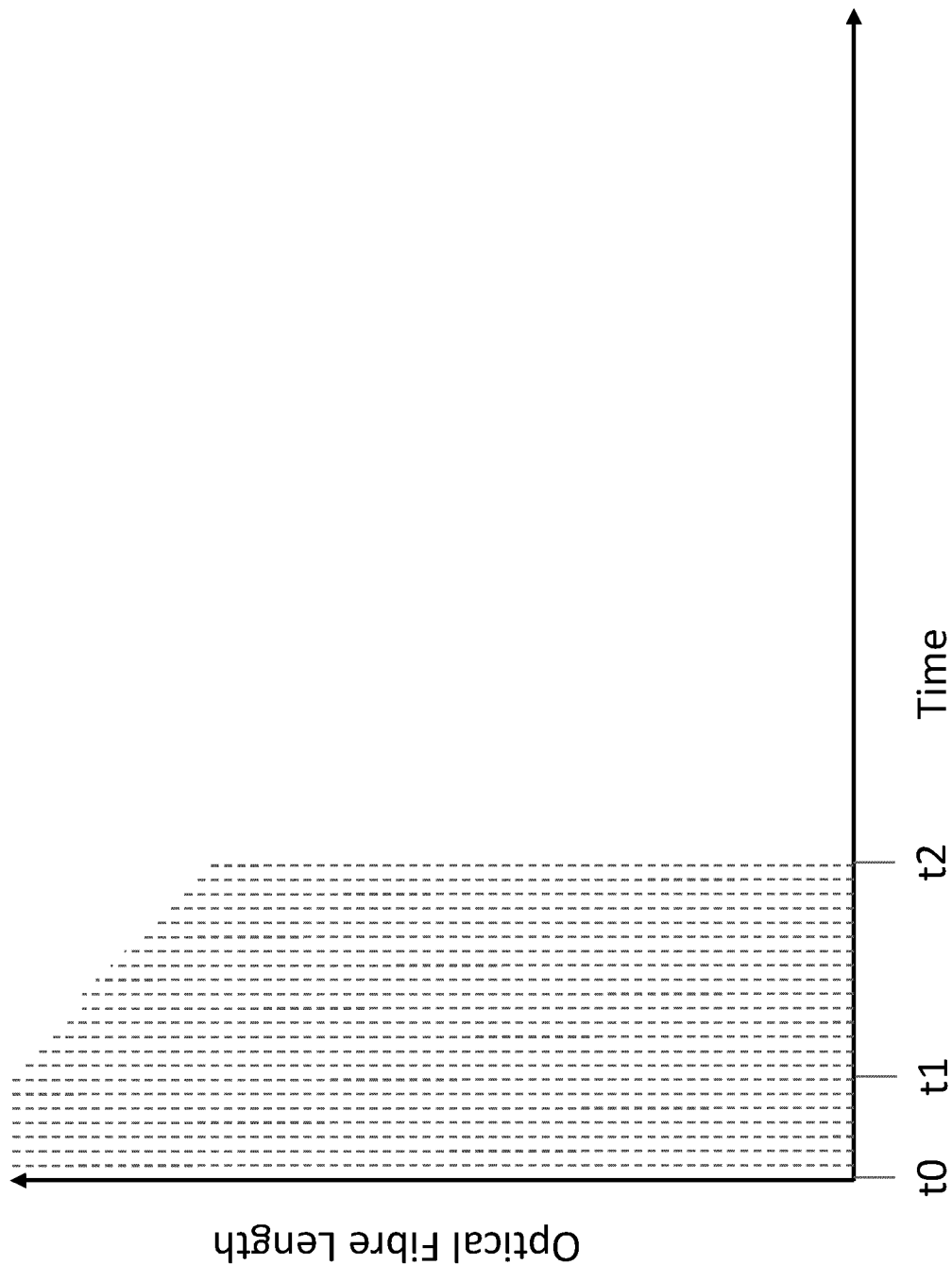

In FIG. 23, optical fibre has despooled from the spool and a number of makers are no longer present at time t2. The visual representation of markers present at time t2 may correspond to a second optical signature. Time t2 is greater than time t1. The number of markers no longer present is determined and the length of despooled optical fibre is calculated based on the number of markers. For example, at time t2 approximately 15 (fifteen) markers are no longer present. Each marker represents a change in winding pitch. Each change in winding pitch may occur after a uniform length of optical fibre, e.g. 15 cm, 30 cm, 50 cm, 1 m, 2 m, 5 m, 15 m, 30 m, etc. Accordingly, multiplying the number of missing markers (15) by the uniform length (30 m) may be used to calculate the length of despooled fibre, e.g. 450 m. Thus, at time t2, the spool is 450 m from its original uphole location. Alternatively or additionally, the number of markers still present is determined. Generally the first and second optical responses are compared. The range of the spool may thus be found i.e. the distance between the spool's original location and the spool's current location. This may correspond to a depth of the spool in a borehole, e.g. a wellbore.

Figure 24:
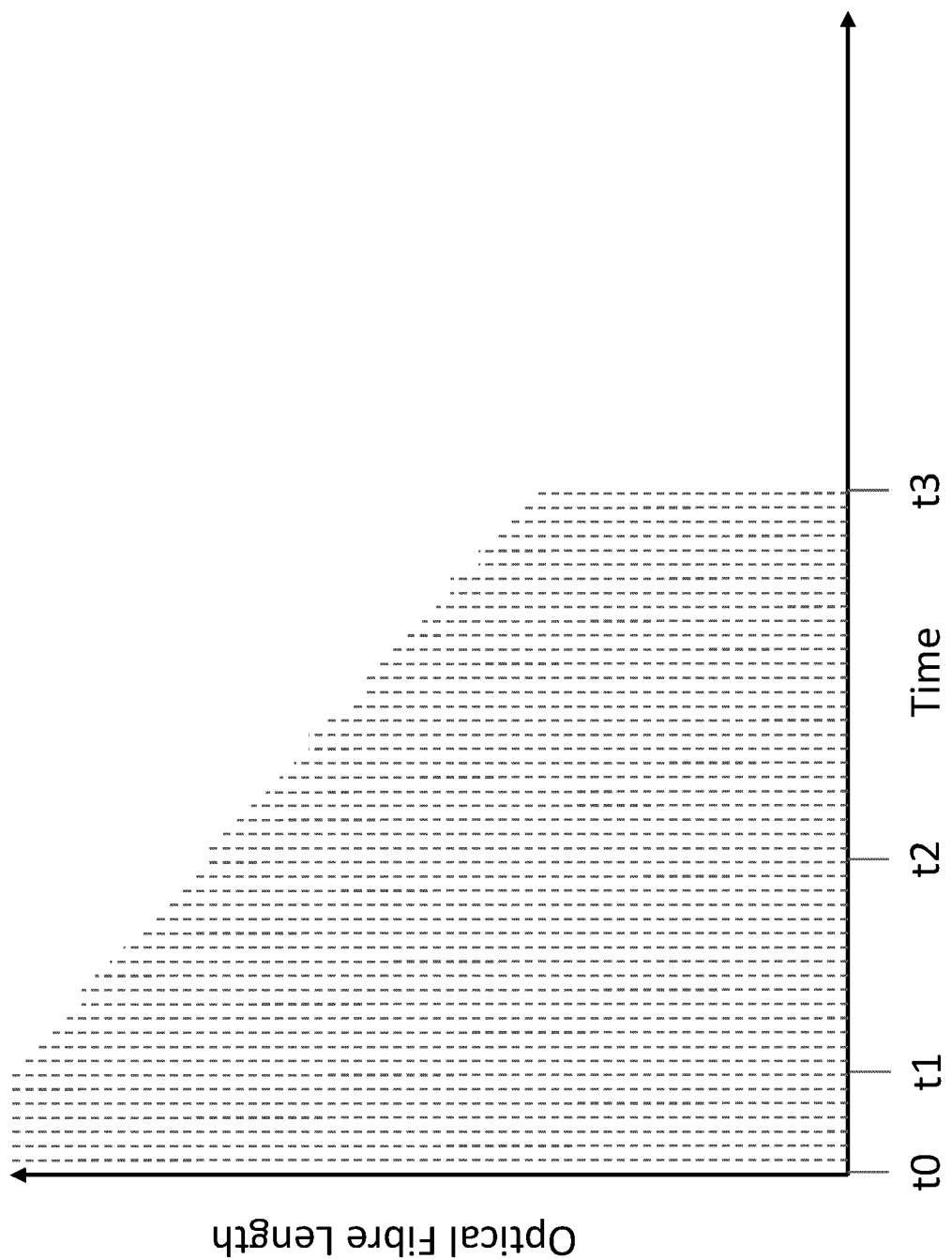

In FIG. 24, additional optical fibre has despooled from the spool and a number of makers are no longer present at time t3. Time t3 is greater than time t3. The number of markers no longer present is determined and the length of despooled optical fibre is calculated based on the number of markers. For example, at time t3 approximately 41 (forty-one) makers are no longer present. Accordingly, multiplying the number of missing markers (41) by the uniform length (30 m) may be used to calculate the length of despooled fibre, e.g. 1230 m.

Figure 25:
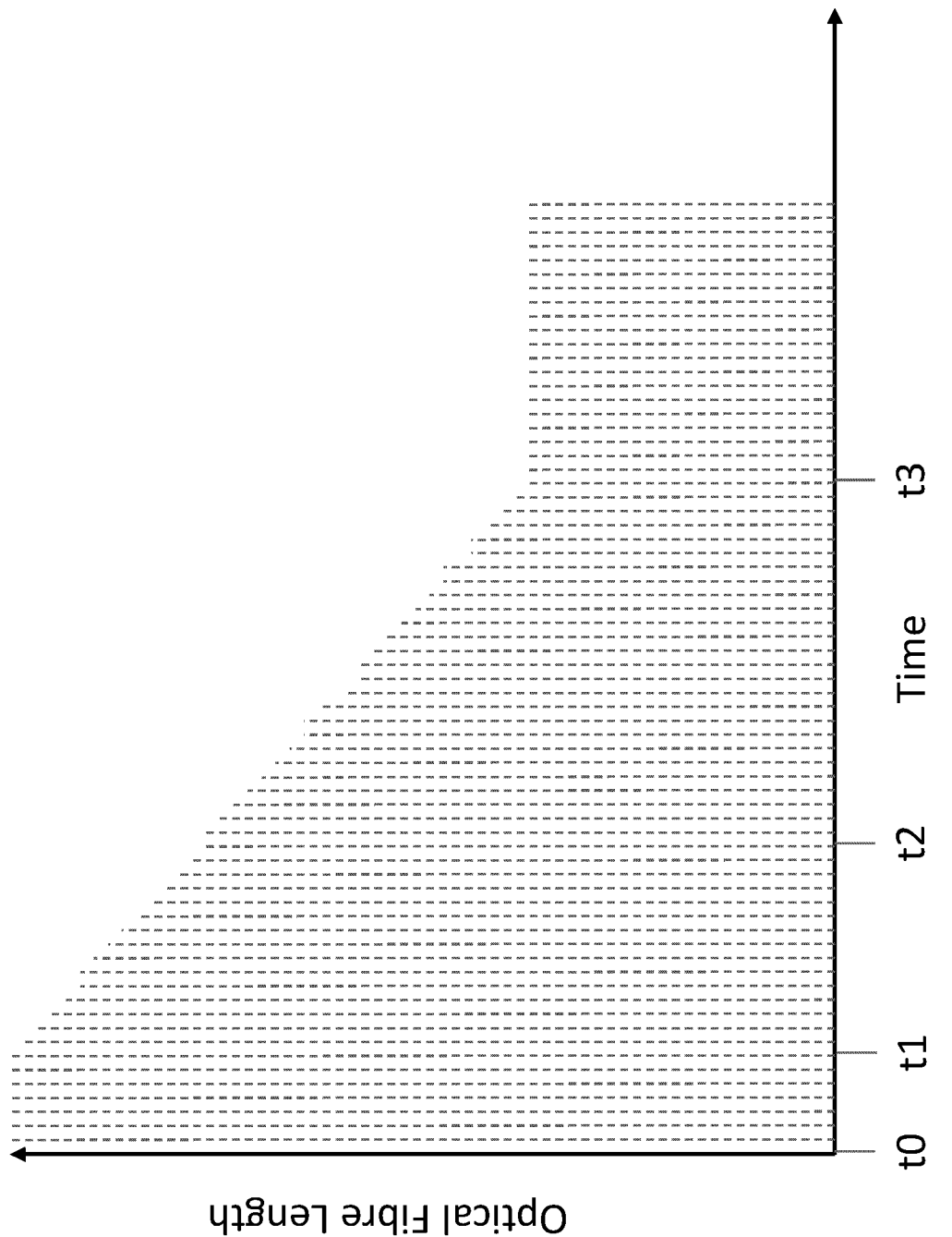

In FIG. 25, no additional optical fibre has despooled from the spool and the number of markers no longer present has not changed. This may be because the spool has reached a blockage in the wellbore, hit rock or other formation, or reached the bottom of the wellbore. In particular, the spool may have reached a plug in the wellbore, e.g. a plug in casing or tubing of the wellbore. Determining the number of makers no longer present (e.g. 41) may be used to determine the range or downhole depth of the plug (e.g. 1231 m).

As previously described, the optical fibre may then be cut at a surface location and the spool and optical fibre discarded in the wellbore. Alternatively, the spool and optical fibre may be retrieved from the wellbore for removal or future additional use, e.g. for use in additional distributed sensing, DTS, DPS or DAS.

As will be appreciated, the length of fibre between winding pitches may be adjusted to achieve the resolution desired depending on the particular application. For example, the length may be decreased so that additional markers are present in the optical signature is high resolution is desired. Alternatively, the length may be increased so that fewer markers are present in the optical signature if simplicity of winding is desired.

It should be understood that the examples provided are merely exemplary of the present disclosure, and that various modifications may be made thereto.

The invention claimed is:

1. A method for range finding, the method comprising:
    determining a first optical signature of a spool of optical fibre wound in a winding pattern which comprises repeated changes in a winding parameter to provide a different optical response such that the first optical signature comprises a first plurality of markers representing each change in the winding parameter;
    despooling the fibre from the spool;
    determining a second optical signature of the spool of optical fibre after despooling the fibre from the spool; and
    calculating a length of despooled fibre based on a comparison of the first and the second optical signatures.

2. The method of claim 1, wherein calculating the length comprises:
    comparing the first plurality of markers of the first optical signature and a second plurality of markers of the second optical signature.

3. The method of claim 2, wherein comparing comprises at least one of:
    determining a number of the first plurality of markers no longer present among the second plurality of markers; and
    determining a number of the first plurality of markers still present among the second plurality of markers.

4. The method of claim 3, wherein calculating the length comprises:
    correlating the number of the first plurality of markers with known lengths of optical fibre.

5. The method of claim 1, wherein at least one of:
    determining the first optical signature comprises determining the first optical signature by distributed sensing including distributed temperature sensing (DTS), distributed pressure sensing (DPS) or distributed acoustic sensing (DAS); and
    wherein determining the second optical signature comprises determining the second optical signature by DTS, DPS or DAS.

6. The method of claim 1, wherein at least one of determining the first optical signature and determining the second optical signature comprises:
    sending a laser pulse along the optical fibre; and
    measuring resulting reflected radiation.

7. The method of claim 6, wherein measuring resulting reflected radiation comprises:
    monitoring a coherent Rayleigh backscatter noise signature in the optical fibre.

8. The method of claim 1, wherein the winding parameter is at least one of a winding pitch, winding radius, winding tension or pressure, a twist imparted in the optical fibre, and winding speed.

9. The method of claim 1, wherein the winding pattern of the optical fibre on the spool is formed by a plurality of wrap segments arranged axially along a spool axis of the spool.

10. The method of claim 9, wherein a transition from one wrap segment to another wrap segment is provided by a change in winding pitch.

11. The method of claim 10, wherein changes in winding pitch occur at repeating intervals between wrap segments.

12. The method of claim 1, wherein despooling the fibre from the spool comprises:
    deploying the spool in a wellbore; and
    releasing the spool into the wellbore.

13. The method of claim 1, further comprising:
    determining a location of the spool based on the calculated length.

14. The method of claim 1, wherein at least two of despooling the fibre, determining the second optical signature, and calculating the length occur simultaneously.

15. The method of claim 1, wherein repeated changes in winding pitch provide the different optical response due to a change in an optical fibre angle.

16. A device for use with a spool of optical fibre for range finding, wherein the device is configured to:

determine a first optical signature of the spool of optical fibre wound in a winding pattern which comprises repeated changes in a winding parameter to provide a different optical response such that the first optical signature comprises a plurality of markers representing each change in the winding parameter;

determine a second optical signature of the spool of optical fibre after fibre has been despooled from the spool; and calculate a length of despooled fibre based on a comparison of the first and second optical signatures.

17. The device of claim 16, wherein the device comprises a processor and a memory, and wherein the device is configured for use at surface and/or uphole of the spool.

18. A system for range finding for use in a wellbore, the system comprising:

the device of claim 16; and the spool of optical fibre located downhole of the device.

19. A method of deploying optical fibre, the optical fibre wound in a winding pattern on a spool, the winding pattern comprising repeated changes in a winding parameter, the method comprising:

determining a first optical signature of the spool of optical fibre, the first optical signature comprising a plurality of markers representing each change in the winding parameter;

deploying the spool in a wellbore such that optical fibre despools from the spool;

determining a second optical signature of the spool of optical fibre after deploying the spool; and calculating a length of despooled optical fibre based on a comparison of the first and second optical signatures.

20. The method of claim 19, wherein at least two of the steps of deploying the spool, determining the second optical signature and calculating the length are performed approximately simultaneously.

\* \* \* \* \*